United States Patent [19]

Shoupp et al.

[11] 4,101,792

[45] Jul. 18, 1978

[54] MECHANICALLY-POWERED ELECTRIC GENERATOR FOR INSTANT-PHOTOGRAPHIC CAMERA AND OTHER APPARATUS

[75] Inventors: William E. Shoupp, Pittsburgh; Walter V. Bratkowski, McKeesport, both of Pa.

[73] Assignee: Westinghouse Electric Corp., Pittsburgh, Pa.

[21] Appl. No.: 501,560

[22] Filed: Aug. 29, 1974

Related U.S. Application Data

[62] Division of Ser. No. 380,179, Jul. 17, 1973, Pat. No. 3,840,297.

[51] Int. Cl.² .......................................... H02K 35/00
[52] U.S. Cl. ...................................... 310/15; 310/30; 354/135
[58] Field of Search ............................ 310/15, 30, 29; 354/135

[56] References Cited

U.S. PATENT DOCUMENTS 3,065,366  11/1962  Speiser et al. ....................... 310/15
3,153,735  10/1964  Branagan et al. ................... 310/15

*Primary Examiner*—Donovan F. Duggan
*Attorney, Agent, or Firm*—D. S. Buleza

[57] ABSTRACT

A compact electric generator that is powered by a tensioned spring and adapted to serve as an integral and permanent source of electric energy for a photographic camera or other apparatus. The generator includes a permanent magnet, a pole piece and a reciprocally-movable armature that define a magnetic circuit. The permanent magnet is also movable with respect to the pole piece and armature and is so oriented, when the generator is cocked, that the field strength of the magnetic circuit is sufficient to permit the pole piece to magnetically "capture" the armature and hold it in a predetermined position against the action of the tensioned spring. The generator is tripped by displacing the permanent magnet and thus weakening the field strength of the magnetic circuit. This permits the tensioned spring to overcome the magnetic "lock" on the armature and rapidly propel the latter away from the pole piece. The resultant sudden change in the flux density of the magnetic circuit induces a voltage pulse in an associated wire coil.

12 Claims, 11 Drawing Figures

VOLTAGE REGULATOR
AND ENERGY STORAGE
(73)

MECHANICALLY-POWERED ELECTRIC GENERATOR FOR INSTANT-PHOTOGRAPHIC CAMERA AND OTHER APPARATUS

CROSS-REFERENCES TO RELATED APPLICATIONS

This application is a division of application Ser. No. 380,179 filed July 17, 1973 (now U.S. Pat. No. 3,840,297).

The subject matter of this application is also related to that disclosed and claimed in application Ser. No. 380,178 of W. E. Shoupp, W. V. Bratkowski and D. J. Boomgaard; and application Ser. No. 380,180 (now U.S. Pat. No. 3,842,427) of the present inventors, both of which are assigned to the assignee of the present application.

BACKGROUND OF THE INVENTION

1. Field of the Invention

This invention generally relates to the art of generating electrical energy and has particular reference to a compact mechanically-powered electric generator that is adapted for use in a photographic camera or other apparatus which requires a small but reliable source of electricity.

2. Description of the Prior Art

Photographic cameras having mechanically tripped and powered devices that generate electrical energy for firing photoflash lamps or operating other devices associated with the camera are known in the art. A camera having such an electric generator wherein a voltage pulse is produced by a flat coil of wire that is attached to the camera shutter and propelled into the gap of a permanent magnet when the shutter is tripped is disclosed and claimed in U.S. Pat. No. 3,709,118 issued Jan. 9, 1973 to the present inventors. The "built-in" electric generator replaces the battery normally employed in the camera and thus eliminates the problems encountered in firing a photoflash lamp when the batteries become weak or dead, or the battery contacts become dirty or oxidized.

A camera having a flap-type shutter with a permanent magnet that enters a stationary wire coil when the shutter is actuated and thus generates a voltage pulse which "fires" a thyratron tube in an external electrical circuit which flashes a gaseous discharge lamp is described in U.S. Pat. No. 2,538,577 issued Jan. 16, 1951 to C. W. McCarty. A camera having a magnetic circuit with an oscillating core element which generates a voltage and fires a photoflash lamp when the shutter is actuated is disclosed in U.S. Pat. No. 3,480,808 issued Nov. 25, 1969 to H. F. Reith. A camera shutter and electric generator assembly wherein the voltage is produced by a rotor that is rotated when the shutter is actuated is disclosed in U.S. Pat. No. 3,703,132, issued Nov. 21, 1972 to D. E. Beach.

Various other types of electric generators that produce a voltage in response to changes in the flux density or flux distribution in a magnetic circuit are disclosed in U.S. Pat. No. 2,426,322; 2,784,327; 2,904,707; 3,065,366; and 3,500,086.

Camera flashguns having an integral electric generator consisting of a permanent magnet and a pivoted armature that is manually actuated by a shutter-release cable or powered by a leaf spring are disclosed in U.S. Pat. Nos. Re. 22,433; 2,448,897 and 2,490,225.

Instant-photographic type cameras which are collapsible are also well known in the art. A fully automatic single-lens reflex camera that is foldable into thin compact size suited for convenient carrying in a pocket of the photographer is disclosed in U.S. Pat. No. 3,714,879 issued Feb. 6, 1973 to Edwin H. Land et al. Motive power for such cameras is derived from a high-speed electric motor that is energized by a battery which constitutes part of the film cassette that is inserted into the base portion of the camera. Cameras of this type are known in the art as "SX-70" Land cameras and are presently being marketed by the Polaroid Corporation. The various components and features of such cameras and the new instant-developing film which they employ are described in the January 1973 issue of "Popular Science" magazine (pages 84–87 and 114).

In view of the added cost of the disposable battery and the potential problems of weak or dead cells and dirty contacts traditionally associated with the use of batteries in cameras, it would be very desirable from both an economical and operational standpoint to provide a compact mechanically-actuatable electric generator which can be used in such collapsible instant-photographic type cameras in lieu of a battery.

SUMMARY OF THE INVENTION

The foregoing objectives and other advantages are achieved in accordance with the present invention by replacing the battery and electric motor now employed in a conventional "SX-70" Land camera with a small powerful electric generator that is automatically cocked and triggered when the camera is indexed through one cycle of operations required to snap a photograph and then process and eject the exposed film from the camera. The generator is located in the space within the camera housing occupied by the electric motor in a conventional camera and has a spring-loaded armature that is reciprocally moved a very short distance and produces the desired electrical potential by rapidly changing the flux in a magnetic circuit which is inductively coupled to a coil of fine wire.

The electric generator supplies enough power to operate the solid-state logic circuit components used in the "SX-70" Land camera as well as the automatic "f" stop control, shutter speed control and other electrical devices that are built into such cameras. The gear-train mechanism which pushes the exposed film unit through the processing rollers is manually operated by a knob that also cocks the electric generator for the next picture-taking cycle. The elimination of the integral battery from the film cassette permits two additional film units to be added to the 10-unit pack now employed in the cassettes used in such cameras. The generator also supplies sufficient energy to fire a selected photoflash lamp in a multi-flash unit that is mounted on the camera when flash pictures are taken.

BRIEF DESCRIPTION OF THE DRAWINGS

A better understanding of the invention will be obtained from the exemplary embodiments shown in the accompanying drawings, wherein.

DESCRIPTION OF THE PREFERRED EMBODIMENT

Figure 1:
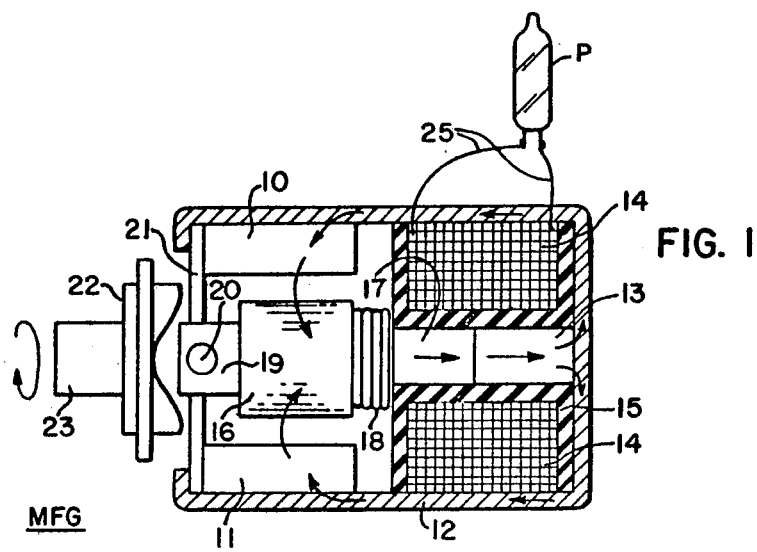
FIG. 1 is a simplified side elevational view, partly in section, of a cocked magnetic-flux generator according to the invention.

In FIG. 1 there is shown a magnetic-flux type generator (MFG) which illustrates the basic concept of electrical power generation utilized in the invention. As shown, the generator consists of a pair of spaced permanent magnets 10 and 11 that are aligned with one another and secured to a metal casing 12 of generally cylindrical configuration that has a pole piece 13 secured to and axially-extending from its end wall. Pole piece 13 is also of cylindrical configuration and is located within an annular coil 14 of fine insulated wire that is wound about a suitable bobbin 15 of non-magnetic material such as plastic. A reciprocally-movable armature 16 is disposed at the other end of casing 12 and has two depending arms 17 and 19. Arm 17 is slidingly nested within the opening of bobbin 15 and arm 19 has a protruding pin 20 and rides within a suitably shaped hole in an end plate 21 that is fastened to casing 12 and magnets 10 and 11.

A coil spring 18 (shown in compressed condition) is located on armature arm 17 and interposed between the bobbin 15 and the enlarged central part of the armature 16. A cam 22 having a central recess adapted to receive the end of armature arm 19 is supported outside the casing 12 by suitable means (not shown) and has a cam surface that is arranged to engage the pin 20. A depending shaft 23 permits cam 22 to be rotated, as indicated by the arrow. The wire winding comprising coil 14 is connected by suitable conductors 25 to a photoflash lamp P.

The magnetic-flux generator MFG is shown in cocked position in FIG. 1. In this position the armature arm 17 is in abutting engagement with the pole piece 13, thus constituting a magnetic circuit (indicated by the series of arrows) which extends through the arm 17, the abutting pole piece 13, the end wall and side walls of the metal casing 12, into permanent magnets 10, 11 and then into the central portion of the armature 16 through the small air gaps. The magnetic attractive force exerted on armature 16 by pole piece 13 is so correlated relative to the stiffness of the spring 18 that the latter, when in compressed condition as shown in FIG. 1, is unable to push the armature 16 away from the pole piece 13. The spring 18 thus serves as a means for storing mechanical energy which permits the generator MFG to be cocked and remain in such condition until tripped.

Figure 2:
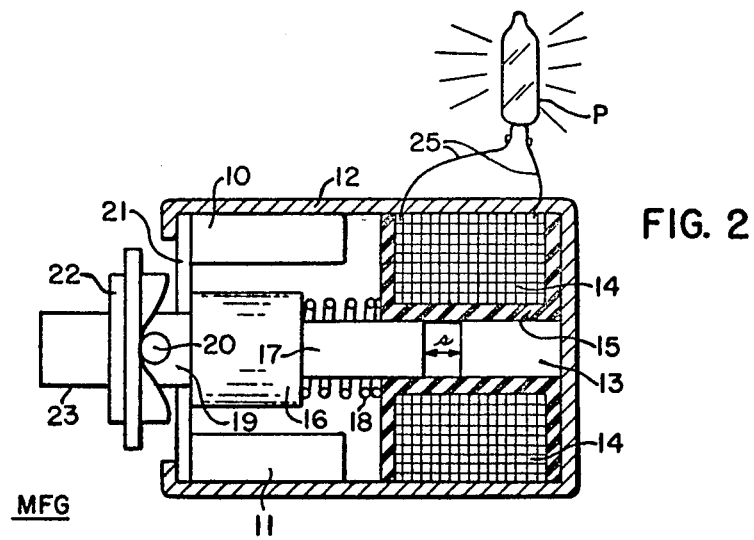
FIG. 2 is a similar view of the generator after it has been tripped and fired a photoflash lamp.

Tripping of the electric generator MFG is accomplished by altering the magnetic circuit so that the magnetic pull on armature 16 is weakened sufficiently to enable the compressed spring 18 to propel the armature 16 in an axial direction—thus providing a snap action. Such altering of the magnetic circuit is achieved by moving one of the permanent magnets 10, 11 from its original aligned position relative to the armature 16, thus increasing the air gap and producing the required reduction in the strength of the magnetic field. As soon as this occurs, the spring 18 snaps the armature 16 outwardly and pin 20 engages the depressed portion of the curved surface of the cam 22, as shown in FIG. 2. The resulting rapid collapse of the magnetic flux causes the wire coil 14 to generate a voltage pulse which is delivered to the photoflash lamp P by the conductors 25 and fires the lamp so that it produces a flash of light, as shown. The generator MFG is then in condition to be recocked, which operation is accomplished by returning the displaced permanent magnet to its original aligned position with the armature 16 and the other magnet. The shaft 23 and cam 22 are then rotated, as indicated by the arrow in FIG. 1. This causes pin 20 to ride up the elevated portion of the arcuate surface of cam 22 and pushes the armature 16 into abutting magnetically-locked relationship with the pole piece 13 against the action of spring 18 (see FIG. 1).

As will be noted in FIG. 2, the spacing "s" between pole piece 13 and arm 17 of the armature 16 (when the latter is in uncocked or tripped position) is just slightly larger than the axial movement of the armature 16 effected by the interaction of the pin 20 and arcuate surface of the cam 22. The total distance travelled by armature 16 when cocked is in the order of about ⅛ of an inch (3.175 mm.).

Figure 3:
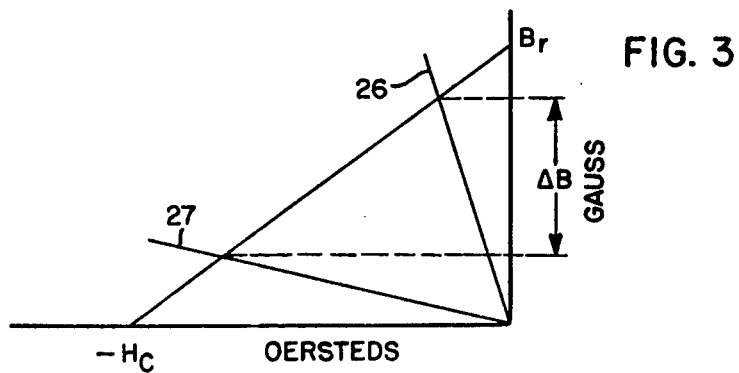
FIG. 3 is a graph depicting a typical demagnetization curve and permeance lines for the magnetic-flux generator shown in FIGS. 1 and 2.

In the closed circuit or cocked position the permanent magnet operating point is shown as permeance line 26 in the demagnetization curve illustrated in FIG. 3. When the armature 16 is tripped, the flux collapses in the magnetic circuit and the operating point of the permanent magnets 10, 11 is at permeance line 27 shown in the graph. The flux through or linking the fine-wire coil 14 is thus changed by ΔB in a given time Δt. This change in flux induces a voltage in the wire coil 14 which is used to electrically power the camera (as hereinafter described) and is defined by the following mathematical relationship:

$$V = -N\frac{d\phi}{dt} = -NA\frac{dB}{dt} \text{ (volts)}$$

where:
B = Flux Density in Gauss
N = Number of Turns in the Wire Coil
A = Pole face area $$dB/dt + \lim_{\Delta t \to 0} \frac{\Delta B}{\Delta t}.$$

Adaptation of Electric Generator to Instant-Photographic Type Camera

Figure 4:
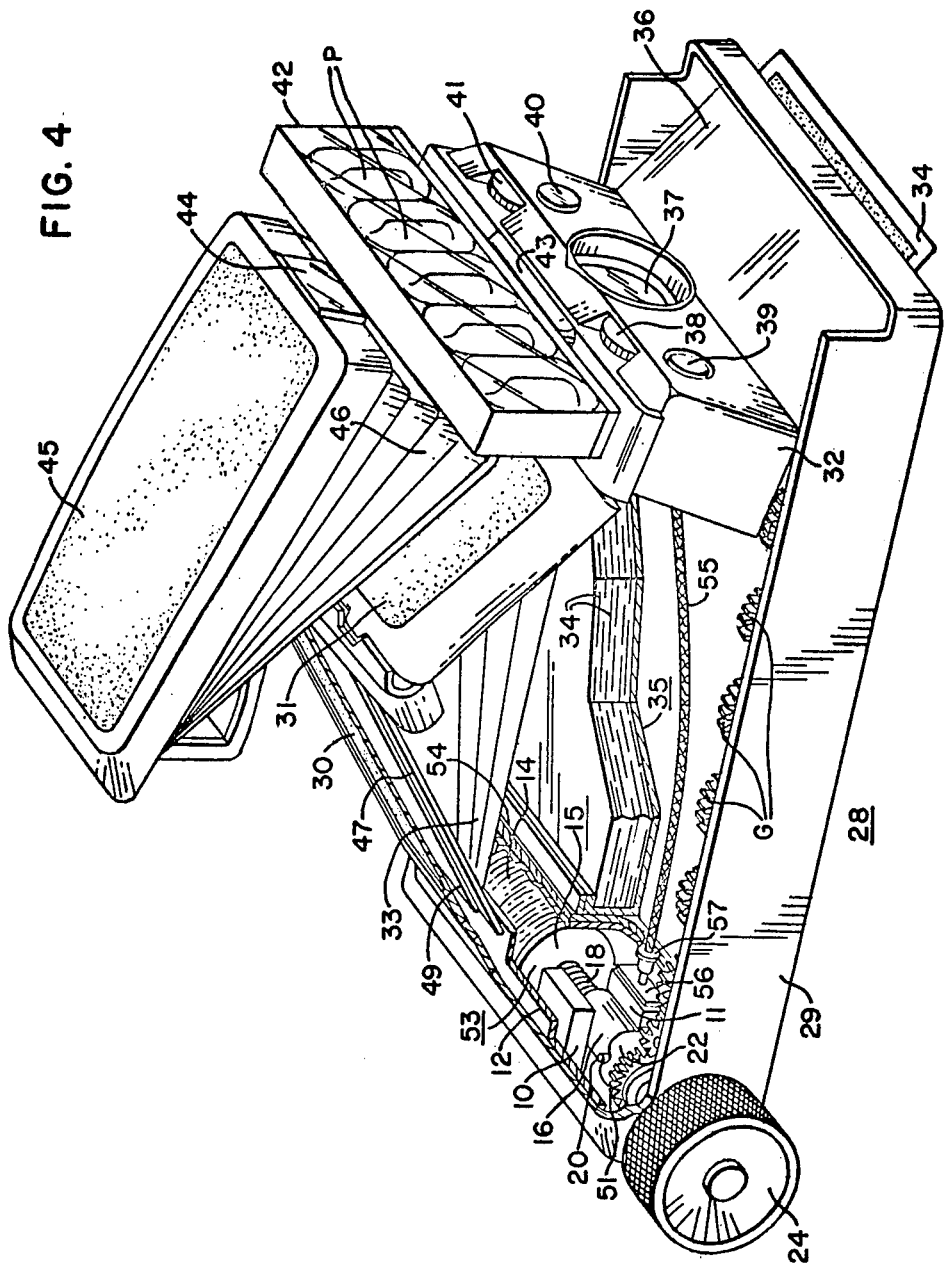
FIG. 4 is a pictorial view of a modified "SX-70" Land camera that is fitted with a "FlashBar" lamp unit and contains an electric generator of the type shown in FIGS. 1 and 2.

In FIG. 4 there is shown an "SX-70" Land camera 28 that has been modified to include a magnetic-flux generator of the type just described, which generator replaces the electric motor and filmpack battery normally used in such cameras. The electric generator is indicated by the general reference numeral 53 and is located in the space at the rear of the camera normally occupied by the high-speed electric motor. The camera 28 is shown in its extended condition and generally comprises a base portion 29, a rear panel 30, a forward panel 31 and an exposure-control housing 32 that are hinged to each other in such a manner that the camera can be locked in the extended position and collapsed into compact rectangular shape by linkage means (not shown) in accordance with the teachings of the aforementioned U.S. Pat. No. 3,714,879.

The rear panel 30 and forward panel 31 are connected by bellows 33 (only a portion of which is shown in FIG. 4) that provides a light-tight chamber for sequentially exposing film units 34 in cassette 35 that is loaded into the base portion 29 of the camera 28. As the film units 34 are exposed, they are pushed up by a suitable pick means within the camera (not shown) through a pair of processing rollers (elements 52 in FIG. 8) located near the front of the camera and are ejected through an opening located beneath a front panel 36 in the usual fashion. The exposure-control housing 32 contains a lens 37, focusing means which is controlled by a knob 38, a push-button 39 that starts the picture-taking operation, a suitable photocell 40 for measuring the ambient light conditions and adjusting the film exposure, and a knob 41 for varying the darkness and lightness of the developed picture in accordance with the instructions provided on the film cassette 35. The lens 37 is of the four-element type with a movable element, as disclosed in the aforementioned "Popular Science" article. Such a lens is described in Canadian Pat. No. 925,731 issued May 8, 1973 to J. G. Baker.

As shown in FIG. 4, the camera 28 is provided with a multiflash unit 42 that is inserted into a socket 43 located on the top of the exposure-control housing 32 and contains a plurality of photoflash lamps P that are arranged in side-by-side planar array and face toward the scene being photographed. The multiflash unit 42 here shown is a 10-lamp unit known in the art as the "FlashBar" flash array and marketed by the General Electric Company for the "SX-70" Land camera. The "FlashBar" lamp unit is described in detail in U.S. Pat. Nos. 3,598,984; 3,598,985 and 3,609,332.

In contrast to a conventional "SX-70" Land camera that has a single-lens reflex viewing system which utilizes a movable mirror component that converts the camera from a viewing mode to an exposure mode, the modified camera 28 employs a conventional type view finder 44 and a stationary mirror 47. The view finder 44 is housed within a cap 45 that is hinged to the forward panel 31 and is collapsible therewith by means of bellows 46. Camera 28 thus exposes the film units 34 by light rays that pass through the lens 37 and strike the stationary mirror 47 that is secured to the inner surface of the rear panel 31 by a holder 49 and directs the light onto the surface of the film unit 34 located at the bottom of the camera.

Figure 8:
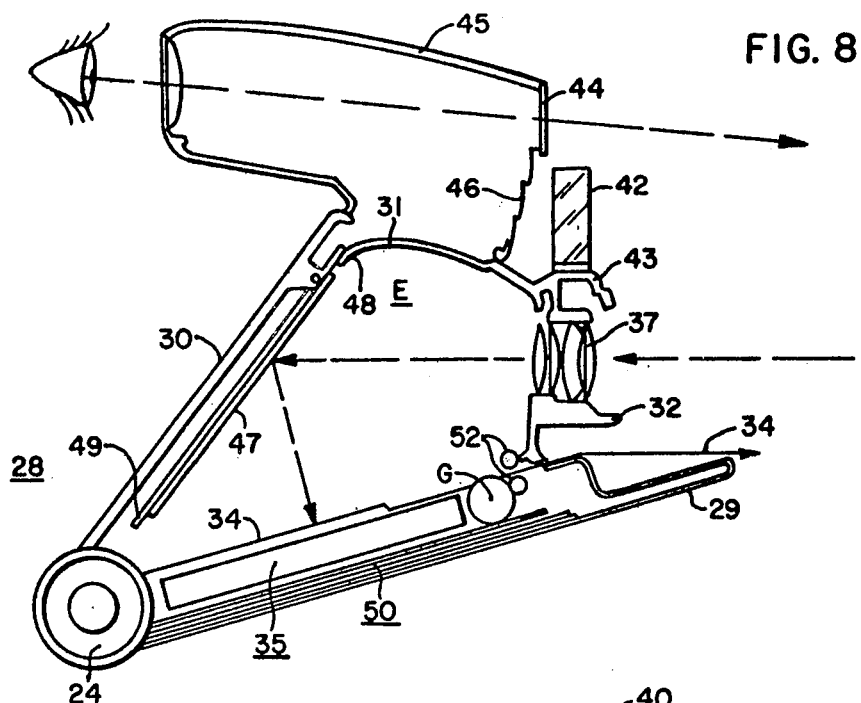
FIG. 8 is a schematic representation of the camera shown in FIG. 4.

A clearer understanding of the operation of the modified camera 28 will be obtained from the schematic representation shown in FIG. 8. As there illustrated, the scene to be photographed is viewed by looking through the eyepiece of the viewer 44 located in the cap 45 of the camera housing. The light from the scene being photographed, when the shutter is actuated, passes through the four-element lens 37, into the exposure chamber E defined by the extended camera housing, strikes the stationary mirror 47 and is reflected downwardly onto the uppermost film unit 34 in the film cassette 35 located in the base portion 29 of the camera. The exposed film unit 34 is then advanced by a manually-rotated knob 24 and a coupled gear train G (hereinafter described) to and through a pair of processing rollers 52 and is ejected from the front of the camera 28 through a suitable slot opening located beneath the exposure-control housing 32. As will be noted, the integrity of the exposure chamber E is preserved by a flexible flap 48 on the end of the forward panel 31 which seats against the holder 49 upon which the mirror 47 is mounted. The "FlashBar" lamp unit 42 is so located that it does not obstruct the view finder 44. The operation of the shutter speed and "f" stop components located within housing 32 is monitored and controlled by a solid-state logic circuit or electronic control unit 50 that is located at the bottom of the base 29 and operates in the manner described in U.S. Pat. No. 3,714,879 referred to previously.

Returning to FIG. 4, advancement of the exposed film unit 34 into the processing rollers 52 (and thence out of the camera 28) is effected by manually actuating the gear train G located within the base portion 29 of the camara housing. This is achieved by a knob 24 located at the rear of the camera 28, which knob turns a drive gear 51 that meshes with the first gear in the gear train G. Rotation of knob 24 also cocks the magnetic flux generator 53. The latter is tripped by pressing button 39 which is coupled by a cable 55 to a plate 56 secured to the movable permanent magnet 11. The cable 55 is fastened to the casing 12 of the generator 53 by a suitable bushing 57, as shown.

Film-Indexing and Generator-Cocking Mechanism

Figures 5, 6, 7:
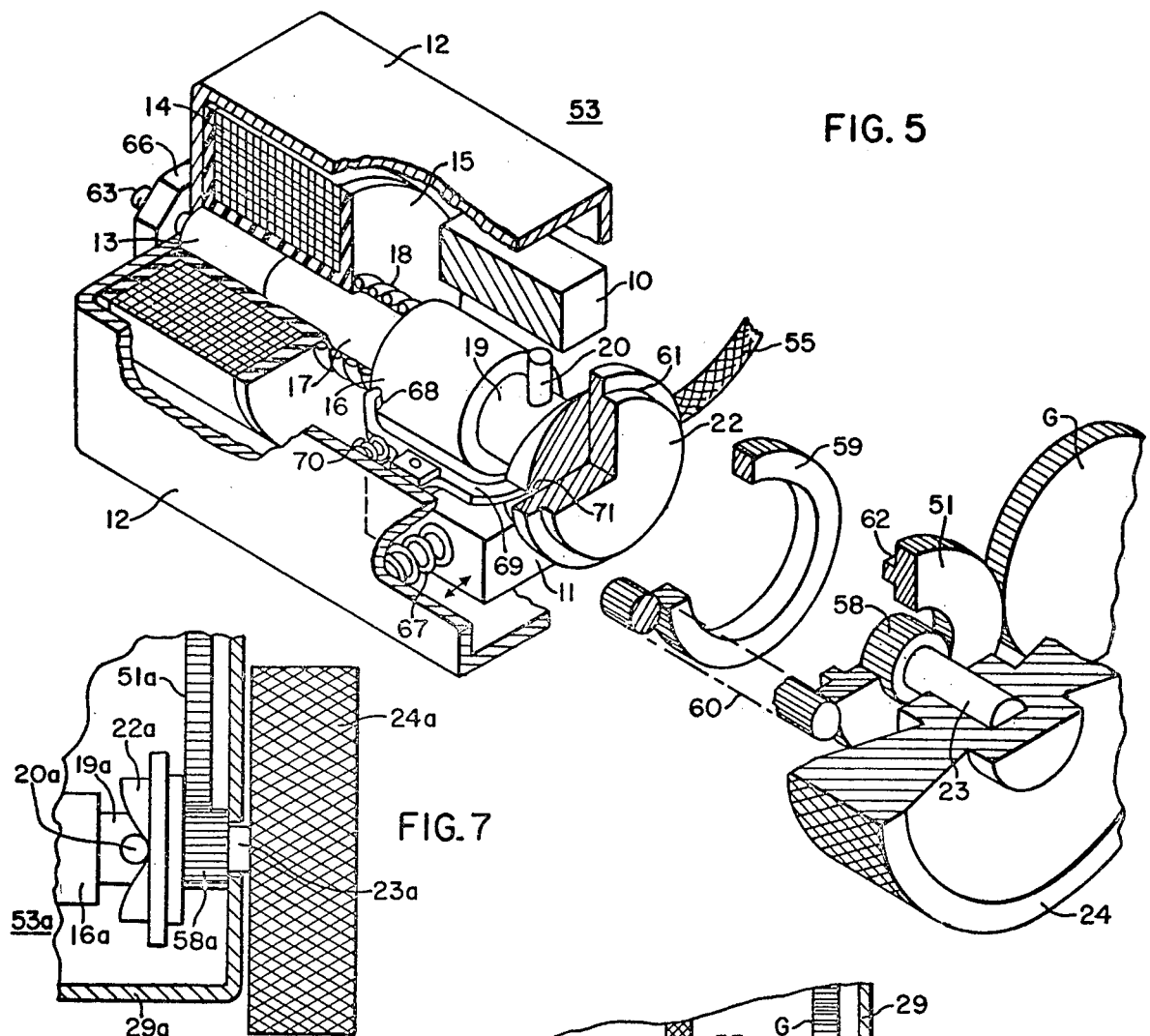
FIG. 5 is an exploded view, on an enlarged scale and partly in section, of the electric generator and gear and slip-clutch coupling arrangement employed in the camera shown in FIG. 4.
FIG. 6 is a plan view, partly in section, of the generator and coupled gear and slip-clutch components shown in FIG. 5.
FIG. 7 is a fragmentary plan view of an alternative generator-cocking and film-advancing mechanism.

A more detailed illustration of the film-indexing and generator-cocking mechanism is shown in FIGS. 5 and 6 and will now be described. As will be noted, the knob 24 is fastened to the shaft 23 of the generator 53, which shaft has a small drive gear 58 on its free end that meshes with annular drive gear 51. The teeth on the outer periphery of drive gear 51 engage the first gear in the gear train G and thus operates the gear train in the manner described in the aforementioned U.S. Pat. No. 3,714,879. Rotation of the knob 24, accordingly, activates the gear train G and the latter actuates the film-indexing mechanisms (not shown) that push the exposed film unit 34 through the processing rollers 52 and out of the camera 28 in the manner described in the aforesaid patent.

To reduce the number of turns required to index a film unit 34 through the rollers 52 and out of the camera 28, the small drive gear 58 can be omitted and drive gear 51 fastened directly to shaft 23.

Rotation of knob 24 also rotates another annular gear 59 through a pinion gear 60 that meshes with the teeth on the outer periphery of drive gear 51. Annular gear 59 snugly fits within an annular race 61 provided in the end face of cam 22 and within a similar race 62 that is provided in the proximate face of the drive gear 51 and thus provides a slip-clutch arrangement that causes the cam 22 to rotate along with knob 24 and intermeshed gear systems as long as the cam is free to move and is in frictional engagement with gear 59.

As shown in FIG. 5 (and more particularly in FIG. 6), the pole piece 13 is fastened to the end wall of the casing 12 by a bolt 63 which has a larger-diameter end segment 64 that slidingly fits within a cylindrical bore 65 provided within the armature 16. Bolt segment 64 thus serves as a pin guide that permits the armature 16 to move in an axial direction when the generator is cocked or tripped. The bolt 63 is fastened to the casing 12 by a lock nut 66.

The generator 53 is shown in its cocked position in FIG. 5 and in its uncocked position in FIG. 6. In the latter Figure there is, accordingly, a spacing "s" between the pole piece 13 and the armature arm 17 and the pin 20 is located at the low or "dwell" point of the cam 22. The generator 53 has thus been tripped and the wire coil 14 has produced the desired voltage pulse, which pulse is delivered by conductors 72 to a voltage-regulator-and-energy-storage component 73 located in an adjacent compartment of the camera defined by a partition 54.

With the generator 53 in tripped condition (FIG. 6), rotation of the knob 24 causes the above-described intermeshing gear system and slip clutch arrangement to rotate cam 22 and push the pin 20 and armature 16 toward the pole piece 13 until the armature arm 17 is magnetically captured and locked in abutting relationship with the pole piece 13 (as shown in FIG. 5). When this occurs, the rounded end 68 of a lever 69 that is pivotally coupled to the casing 12 is engaged by the central portion of the armature 16 and is pushed against the side thereof by a spring 70 interposed between the lever 69 and adjacent wall of the casing. This causes the lever 69 to swivel so that its opposite end slips into a notch 71 located in the periphery of the cam 22—thus locking the cam 22 in a position such that its low or "dwell" point is aligned with the pin 20 when the generator 53 is in cocked position (as shown in FIG. 5). The action of the slip-clutch arrangement permits rotation of the knob 24 to be continued without producing further rotation of the cam 22. Knob 24 can, accordingly, be turned the required number of times to actuate the gear train G and propel the exposed film unit through the processing rollers and out of the camera.

The electric generator 53 is thus automatically cocked and oriented for subsequent tripping when the knob 24 is continuously rotated through one film-indexing and developing cycle.

As shown in FIG. 5, permanent magnet 11 is movable laterally with respect to the armature 16 against the action of a spring 67 that is interposed between magnet 11 and the casing 12. Spring 67 thus automatically returns magnet 11, plate 56, cable 55 and camera button 39 to their original positions when the button is released.

The magnetic-flux generator 53 embodying the present invention is very compact and easily fits into the compartment at the rear of the camera housing 29 normally occupied by the high-speed electric motor in the conventional "SX-70" Land camera. Prototype designs of the generator 53 have shown that a voltage pulse many times greater than that required to reliably fire a photoflash lamp of the type used in a flashcube can be generated with an armature 16 that moves approximately ⅛ of an inch when the generator is tripped, and that reliable tripping can be achieved by moving the permanent magnet 11 a distance of approximately the same order.

In FIG. 7 an alternative arrangement is shown for indexing the exposed film units through the processing rollers and out of the camera. According to this embodiment the slip-clutch arrangement is omitted and knob 24a and its gear 58a are directly coupled to the cam 22a and the drive gear 51a. The correlation of the gear ratios is such that, after a predetetermined number of turns of the control knob 24a that are sufficient to process and eject the exposed film unit out of the camera, the cycle phase switch associated with the ram and cam which are coupled to the gear train in the conventional "SX-70" Land camera described in U.S. Pat. No. 3,714,879 (switch 270, ram 250 and cam 252 in said patent) is actuated to lock the gear train G in a position such that the electric generator 53a is cocked with the pin 20a of the armature 16a in the proper alignment with the dwell point of the cam 22a.

Electrical System of Camera

Figure 9:
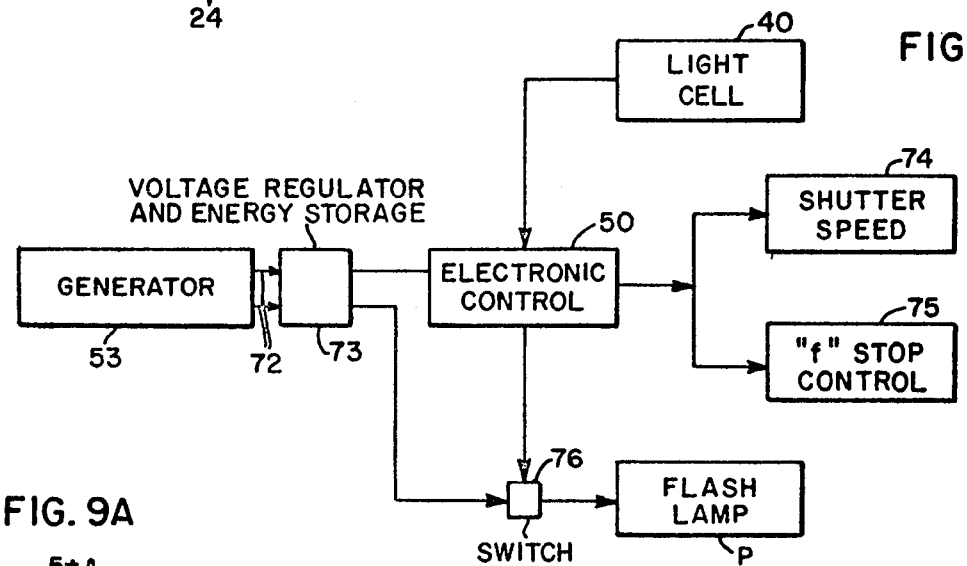
FIG. 9 is a block diagram showing the various electrical components employed in the camera shown in FIGS. 4 and 8 and the manner in which they are energized by the electric generator.

A schematic representation of the electrical devices and circuit employed in the camera 28 is shown in FIG. 9. As indicated, the output of the magnetic flux generator 53 of the present invention is fed into a voltage-regulator-and-energy-storage component 73 which converts the short voltage pulse into a voltage of smaller magnitude but longer duration. This modified voltage is fed into the electronic control component 50 of the camera, together with the output of the silicon light cell 40, so that the control circuit 50 energizes the shutter speed and "ƒ" stop control components 74 and 75, respectively, in the manner described in the aforesaid U.S. Pat. No. 3,714,879. The output of the voltage-regulator-and-energy-storage component 73 is also fed into a switch 76 which, when closed, connects the generator 53 to a flashlamp P and causes it to fire in synchronized fashion with the opening of the shutter when flash pictures are being taken. Switch 76 is located on a suitable part of the camera 28 so that it can be conveniently operated to cut the lamp P in and out of the circuit, as desired.

Figure 9A:
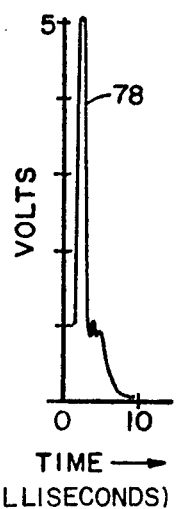
FIGS. 9A and 9B are graphs depicting the voltage pulses produced by the electric-generator of and the voltage-regulator components of the aforementioned camera, respectively.
Figure 9B:
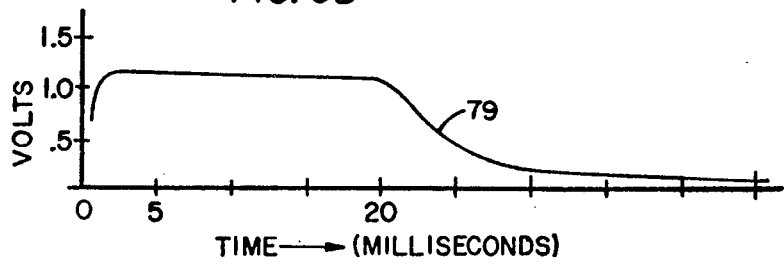

A typical voltage pulse 78, as shown in FIG. 9A, produced by one prototype design of the generator 53 peaks sharply at around 5 volts and lasts for approximately 8 to 10 milliseconds. The voltage-regulator-and-energy-storage circuit 73 converts this short voltage pulse into a pulse that is maintained at a value of approximately 1.3 volts for approximately 20 milliseconds, as shown by curve 79 of FIG. 9B. The aforementioned voltage-regulator-and-energy-storage circuit is described in detail in the aforementioned application Ser. No. 380,178, which application also discloses a dynamic "ƒ" stop control system that can be used in camera 28. Voltages and energies of greater magnitude can be readily obtained by using different permanent magnet structure and coil designs.

The electric generator of the present invention can, of course, also be employed in various other modified instant-photographic cameras having different features and selling prices, as disclosed in the parent application Ser. No. 380,179 (U.S. Pat. No. 3,840,297), as well as other types of apparatus that require a compact reliable source of electric energy.

We claim as our invention:

1. A mechanically-powered generator for producing a pulse of electrical energy, said generator being of the recockable type and comprising the combination of;

a permanent magnet and a pole piece that are movable relative to one another and constitute parts of a magnetic circuit, an armature that is movable toward and away from said pole piece and also constitutes part of said magnetic circuit, said armature being magnetically attracted to said pole piece and in magnetically captured relationship therewith when the electric generator is cocked and ready for use, a winding of insulated wire disposed is inductive relationship with said magnetic circuit and oriented to generate a voltage pulse in response to a change in the flux density of the magnetic circuit produced by the movement of said armature relative to said pole piece, means for tripping the cocked electric generator comprising means for displacing said permanent magnet and pole piece relative to one another a sufficient distance to effect a concomitant decrease in the field strength of the magnetic circuit, and means for controllably storing mechanical energy and, in response to the actuation and operation of said tripping means, converting the stored mechanical energy into a force that acts on said armature and is so oriented and of such magnitude that the weakened magnetic attractive force on the armature is overcome and the position of said armature relative to the pole piece is thereby rapidly shifted and causes a voltage pulse to be generated by the wire winding.

2. The electric pulse generator of claim 1 wherein said mechanical-energy storage means comprises a spring that is retained in tensioned condition by the armature and pole piece when said generator is cocked and the armature is in magnetically-captured relationship with said pole piece.

3. The electric pulse generator of claim 1 wherein;
said armature is in physical contact with the pole piece when in magnetically-captured relationship therewith, and
said armature, permanent magnet and wire winding are held in operative relationship with one another by means that limits the movement of the armature away from said pole piece when the cocked generator is tripped.

4. The electric pulse generator of claim 1 wherein;
said pole piece, armature and permanent magnet are held in operative relationship by a metal casing that constitutes part of said magnetic circuit, and
said mechanical-energy storage means comprises a spring.

5. The electric pulse generator of claim 4 wherein;
said spring is disposed between said pole piece and armature,
said pole piece is immovably fastened to the metal casing, and
said permanent magnet is movably secured to said metal casing.

6. The electric pulse generator of claim 1 wherein;
said mechanical-energy storage means comprises a coil spring that is disposed between said pole piece and a part of said armature, and
said coil spring is retained in compressed tensioned condition by the armature and pole piece when the electric generator is cocked and said armature is in magnetically-captured relationship with said pole piece.

7. The electric pulse generator of claim 6 wherein;
said wire winding comprises a wire coil is of annular configuration, and
said pole piece is disposed in the opening of said wire coil.

8. The electric pulse generator of claim 2 wherein;
said pole piece, armature and permanent magnet are held in operative relationship by a casing, and
said armature is returned to magnetically-captured and cocked relationship with said pole piece against the action of said spring by a cam that is rotatably secured to said casing and, when rotated, engages and moves the armature toward the pole piece.

9. The electric pulse generator of claim 8 wherein a second permanent magnet is disposed adjacent said armature and immovably secured to said casing.

10. The electric pulse generator of claim 9 wherein;
said permanent magnets are aligned with one another on opposite sides of the armature, and
said casing is composed of metal and constitutes part of said magnetic circuit.

11. The electric pulse generator of claim 1 wherein;
said permanent magnet is movable and said pole piece is immovably secured to means that holds the generator components in operative relationship,
said armature and permanent magnet are adjacent one another and define an air gap in the magnetic circuit, when the generator is in cocked condition, and
the decrease in the field strength of the magnetic circuit effected by said tripping means is achieved by displacing the permanent magnet in a direction relative to said armature which increases said air gap.

12. The electric pulse generator of claim 11 wherein;
a second permanent magnet is disposed adjacent said armature in fixed spaced relationship therewith, and
said permanent magnets are in substantial alignment with each other and with said armature, when the generator is in cocked condition,
said armature being located between said permanent magnets and thereby providing a pair of air gaps.

* * * * *